United States Patent
Hayton et al.

(10) Patent No.: US 9,749,692 B2
(45) Date of Patent: *Aug. 29, 2017

(54) PROVIDING RECOMMENDATIONS BASED UPON ENVIRONMENTAL SENSING

(71) Applicant: Microsoft Technology Licensing, LLC, Redmond, WA (US)

(72) Inventors: Mike Hayton, Kirkland, WA (US); Zach Johnson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,137

(22) Filed: May 11, 2016

(65) Prior Publication Data
US 2016/0255401 A1 Sep. 1, 2016

Related U.S. Application Data

(63) Continuation of application No. 13/759,906, filed on Feb. 5, 2013, now Pat. No. 9,344,773.

(51) Int. Cl.
*H04N 7/16* (2011.01)
*H04N 21/466* (2011.01)
(Continued)

(52) U.S. Cl.
CPC ... *H04N 21/4668* (2013.01); *G06F 17/30032* (2013.01); *G06Q 30/0252* (2013.01);
(Continued)

(58) Field of Classification Search
CPC ......... H04N 21/4223; H04N 21/42201; H04N 21/42202; H04N 21/42203
See application file for complete search history.

(56) References Cited

U.S. PATENT DOCUMENTS 6,118,888 A * 9/2000 Chino ............... G06F 3/011
382/118
6,954,859 B1 * 10/2005 Simerly ........... G08B 13/19604
348/E7.086
(Continued)

FOREIGN PATENT DOCUMENTS

WO 2004023808 A1 3/2004

OTHER PUBLICATIONS

Nirjon, S. et al., "MusicalHeart: A Hearty Way of Listening to Music," Proceedings of the 10th ACM Conference on Embedded Networked Sensor Systems (SenSys '12), Nov. 6, 2012, Toronto, Ontario, 14 pages.

(Continued)

*Primary Examiner* — Pankaj Kumar
*Assistant Examiner* — Timothy Newlin
(74) *Attorney, Agent, or Firm* — Alleman Hall Creasman & Tuttle LLP

(57) ABSTRACT

Embodiments are disclosed that relate to providing digital content recommendations based upon environmental sensor data. For example, one embodiment provides a computing device configured to receive sensor data from a sensor system, to detect a user present in the use environment via the sensor data, identify the user, recognize a current state of each of one or more use environment state features associated with the user via the sensor data, and store the current state of each of the one or more use environment state features. The computing device is further configured to detect a triggering condition for a selected use environment state feature, and in response provide information related to the selected use environment state feature based upon one or more of the current state of the use selected use environment state feature and a previously-stored state of the selected use environment state feature.

20 Claims, 5 Drawing Sheets

(51) Int. Cl.
*H04N 21/81* (2011.01)
*H04N 21/422* (2011.01)
*G06Q 30/06* (2012.01)
*H04N 21/4223* (2011.01)
*H04N 21/45* (2011.01)
*G06Q 30/02* (2012.01)
*G06F 17/30* (2006.01)
*H04N 21/442* (2011.01)

(52) U.S. Cl.
CPC ..... *G06Q 30/0631* (2013.01); *H04N 21/4223* (2013.01); *H04N 21/42201* (2013.01); *H04N 21/42202* (2013.01); *H04N 21/42203* (2013.01); *H04N 21/44218* (2013.01); *H04N 21/4532* (2013.01); *H04N 21/8126* (2013.01)

(56) References Cited

U.S. PATENT DOCUMENTS

| | | | |
|---|---|---|---|
| 7,542,816 B2 | 6/2009 | Rosenberg | |
| 7,979,284 B2* | 7/2011 | Brown | A61B 5/0022 340/6.1 |
| 8,157,730 B2 | 4/2012 | LeBoeuf et al. | |
| 8,421,746 B2* | 4/2013 | Igoe | H04L 12/2809 345/1.1 |
| 8,428,368 B2* | 4/2013 | Ivanich | H04N 5/4403 382/103 |
| 9,344,773 B2* | 5/2016 | Hayton | G06Q 30/0631 |
| 2003/0093784 A1* | 5/2003 | Dimitrova | H04N 7/163 725/10 |
| 2004/0174431 A1* | 9/2004 | Stienstra | G06F 3/011 348/155 |
| 2005/0018049 A1* | 1/2005 | Falk | H04N 7/181 348/207.99 |
| 2005/0253932 A1* | 11/2005 | Van De Laar | H04N 7/163 348/207.99 |
| 2006/0224046 A1* | 10/2006 | Ramadas | A61B 5/0002 600/300 |
| 2007/0250853 A1* | 10/2007 | Jain | H04H 60/45 725/28 |
| 2007/0274245 A1* | 11/2007 | Balatsos | G06F 1/3203 370/311 |
| 2008/0146892 A1* | 6/2008 | LeBoeuf | A61B 5/11 600/300 |
| 2010/0083373 A1* | 4/2010 | White | G06F 3/017 726/21 |
| 2010/0274568 A1* | 10/2010 | Huhtala | G07F 17/32 705/1.1 |
| 2011/0041154 A1* | 2/2011 | Olson | G06F 17/30787 725/54 |
| 2011/0196519 A1* | 8/2011 | Khoury | H04N 21/4104 700/94 |
| 2012/0068876 A1* | 3/2012 | Bangera | G01S 7/415 342/27 |
| 2012/0072936 A1* | 3/2012 | Small | G06Q 30/00 725/10 |
| 2012/0116684 A1* | 5/2012 | Ingrassia, Jr. | G06F 19/321 702/19 |
| 2012/0124456 A1 | 5/2012 | Perez et al. | |
| 2012/0143662 A1* | 6/2012 | Heath | G01W 1/00 705/14.5 |
| 2012/0254907 A1* | 10/2012 | Serdiuk | A61B 5/0002 725/10 |
| 2012/0304216 A1* | 11/2012 | Strong | H04N 21/440281 725/25 |
| 2012/0324492 A1* | 12/2012 | Treadwell, III | H04H 60/45 725/10 |
| 2013/0034306 A1* | 2/2013 | Ivanov | H04N 21/42202 382/224 |
| 2013/0298146 A1* | 11/2013 | Conrad | H04N 21/252 725/12 |
| 2013/0347018 A1* | 12/2013 | Limp | H04N 21/4826 725/19 |
| 2014/0026156 A1* | 1/2014 | Deephanphongs | H04N 21/25866 725/12 |

OTHER PUBLICATIONS

ISA European Patent Office, International Search Report and Written Opinion Issued in Application No. PCT/US2014/014517, Apr. 10, 2014, WIPO, 10 pages.
United States Patent and Trademark Office, Non-Final Office Action Issued in U.S. Appl. No. 13/759,906, Jun. 25, 2014, 31 pages.
IPEA European Patent Office, Written Opinion of the International Preliminary Examining Authority Issued in Application No. PCT/US2014/014517, Sep. 17, 2014, WIPO, 8 pages.
United States Patent and Trademark Office, Final Office Action Issued in U.S. Appl. No. 13/759,906, Jan. 8, 2015, 34 pages.
United States Patent and Trademark Office, Non-Final Office Action Issued in U.S. Appl. No. 13/759,906, Apr. 28, 2015, 5 pages.
IPEA European Patent Office, International Preliminary Report on Patentability Issued in Application No. PCT/US2014/014517, May 7, 2015, WIPO, 8 pages.
United States Patent and Trademark Office, Final Office Action Issued in U.S. Appl. No. 13/759,906, Aug. 13, 2015, 11 pages.
United States Patent and Trademark Office, Notice of Allowance Issued in U.S. Appl. No. 13/759,906, Jan. 20, 2016, 20 pages.

* cited by examiner

PROVIDING RECOMMENDATIONS BASED UPON ENVIRONMENTAL SENSING

CROSS REFERENCE TO RELATED APPLICATIONS

This application is a continuation of U.S. patent application Ser. No. 13/759,906, filed on Feb. 5, 2013, and titled "PROVIDING RECOMMENDATIONS BASED UPON ENVIRONMENTAL SENSING," the entire disclosure of which is hereby incorporated herein by reference.

BACKGROUND

Consumers of digital media content may discover new content for consumption via a variety of mechanisms. For example, some mechanisms involve a user actively seeking media via preexisting listings, such as by consulting an electronic programming guide. Other approaches may involve tracking a user's media consumption behavior, and then providing recommendations that relate to content consumed by the user.

SUMMARY

Embodiments are disclosed that relate to providing digital content recommendations based upon data acquired via monitoring a digital content consumption use environment. For example, one embodiment provides a computing device configured to receive sensor data from a sensor system including one or more sensors configured to acquire the sensor data by monitoring a use environment. The computing device is further configured to detect a user present in the use environment via the sensor data, identify the user, recognize a current state of each of one or more use environment state features associated with the user via the sensor data, and store the current state of each of the one or more use environment state features. The computing device is further configured to detect a triggering condition for a selected use environment state feature, and, upon detecting the triggering condition, provide information related to the selected use environment state feature based upon one or more of the current state of the use selected use environment state feature and a previously-stored state of the selected use environment state feature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various mechanisms may be used to provide recommendations and/or advertisements for products, media content, and the like that may be of interest to a consumer. For example, various online services (e.g., electronic commerce services) may provide recommendations based on previous and/or current user interaction(s) with the service. However, such mechanisms utilize intentional, conscious user interactions with digital content to produce the recommendations.

Thus, embodiments are disclosed herein that relate to the use of one or more environmental sensors to monitor and understand a variety of user activity, features, etc. in a substantially unobtrusive manner, and thus to provide recommendations in response to a potentially richer set of environmental information. In other words, instead of relying upon one or more users to describe, define, etc. what is "going on" in the environment, it may be desirable to passively detect such information. As one non-limiting example, acoustic sensors may be used to detect and identify music being experienced, and to provide recommendations based on the detected music. As opposed to typical approaches that may rely upon a user to manually effect recommendation mechanism(s) (e.g., via text search, via audio capture mechanism, etc.), such a configuration may potentially provide recommendation(s) in a substantially more unobtrusive and intuitive manner.

Figure 1A:
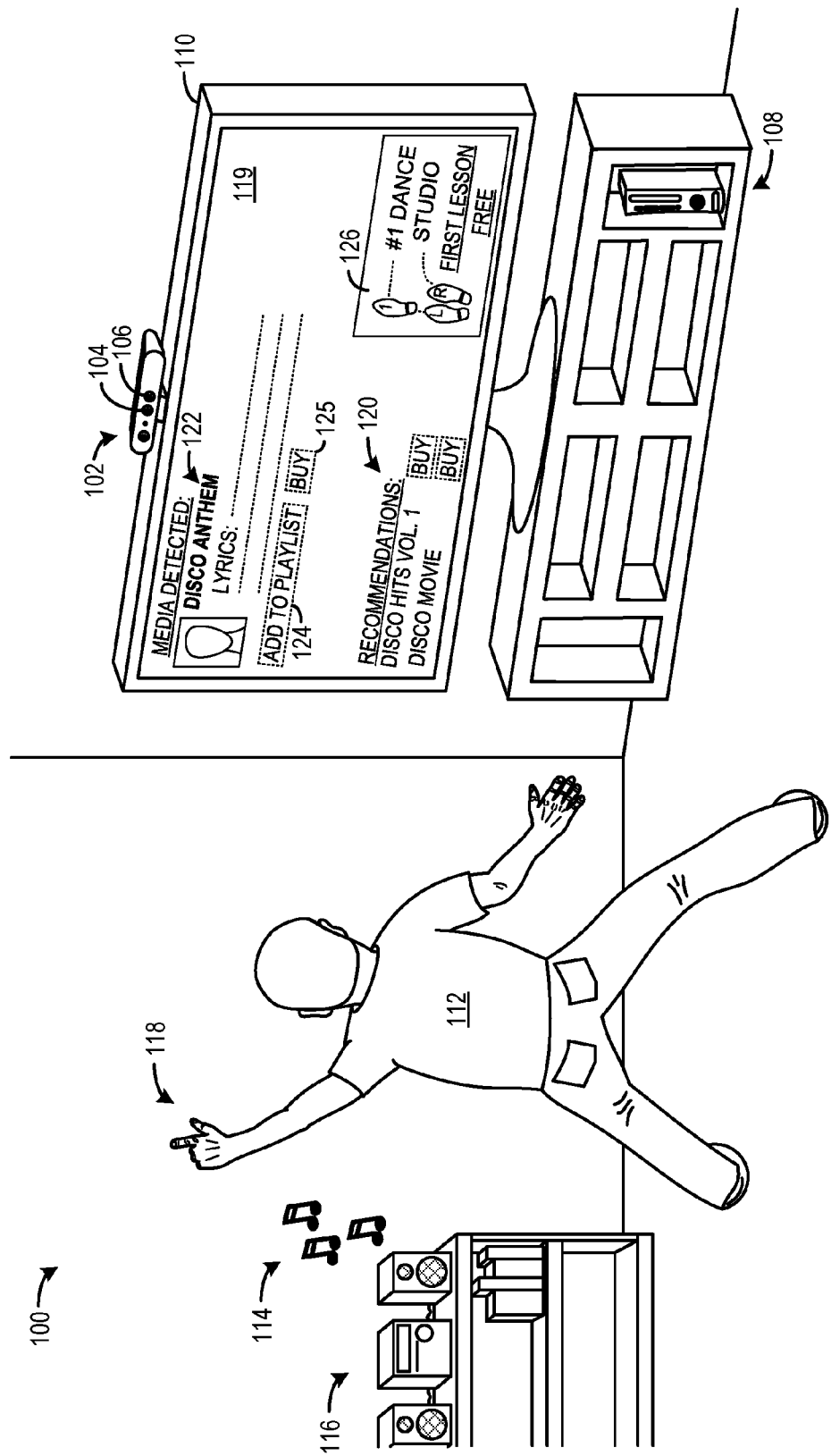
FIGS. 1A and 1B show an example embodiment of a use environment for monitoring user activity.

FIG. 1A illustrates an example use environment 100 for providing recommendations based upon passive sensing of user activity. Use environment 100 includes a sensor system 102 configured to acquire sensor data. Though environment 100 is illustrated as room within a private residence, it will be appreciated that such an environment is presented for the purpose of example, and is not intended to be limiting in any manner.

As illustrated, sensor system includes one or image sensors 104 (e.g., 2D image sensors and/or 3D depth sensors) and one or more audio sensors 106 (e.g., a microphone or directional microphone array). The use of such sensors may allow the ability to recognize positioning and/or shape of one or more state features of environment 100, as described in more detail below. In other embodiments, sensor system 102 may include additional and/or different sensor(s) without departing from the scope of the present disclosure.

As used herein, the term "state feature" refers to any characteristic of use environment 100 and/or of constituent item(s) (e.g., users, pets, furniture and other objects, etc.) thereof that is detectable via one or more sensors of sensor system 102. As non-limiting examples, state features may include, but are not limited to, a physical feature of any one or more users (e.g., body size and shape), an activity performed by any one or more users, and/or a device (e.g., mobile phone, tablet computing device, media player, gaming console, etc.) being operated by any one or more users. In other embodiments, state features may include characteristics of one or more media items (e.g., audio and/or visual media content), such as an identity of the media content item, identity of a constituent component of the content item (e.g., soundtrack content item(s)), a device accessing the content item, and a current access position (e.g., playback position) of the content item. It will be appreciated that these state features are presented for the purpose of example, and are not intended to be limiting in any manner.

Sensor system 102 may be communicatively coupled in some embodiments (e.g., via one or more wireless and/or wired connections) to computing device 108, which, although illustrated as a video game console, may have different configurations (e.g., a desktop computer, laptop computer, notebook computer, etc.) in other embodiments. Further, although illustrated as discrete devices, it will be appreciated that various components of sensor system 102 and computing device 108 may be incorporated into a single device (e.g., mobile computing device) in yet other embodiments. Additionally, sensor data also may be acquired by the computing device 108 from other devices having one or more sensors, such as a mobile device carried by a user. For ease of understanding, sensor system 102 and computing device 108 will be discussed herein as operating cooperatively, though it will be appreciated that the described functionalities may be provided by sensor system 102 and/or computing device 108 in various embodiments without departing from the scope of the present disclosure.

Using the sensor data acquired via sensor system 102 and/or via sensor(s) of other connected device(s), computing device 108 may monitor one or more state features of use environment 100 and provide information, such as metadata, media item and/or activity recommendations, advertisements, etc., related to such state features via an output device (e.g. display device 110) communicatively coupled to computing device 108. Sensor system 102 may be configured to monitor activity within use environment 100, regardless of whether or not such activity involves the direct or indirect utilization of computing device 108. For example, even if a particular media content item (e.g., audiovisual content, video game or other interactive content, etc.) is presented via a media presentation device other than computing device 108, the sensor system may be configured to monitor such activity.

As one non-limiting example depicted in FIG. 1A, user 112 is dancing while listening to audio 114 provided by an audio device 116 (e.g., a stereo). In this particular scenario, recognizable state features include, but are not limited to, user activity 118 (e.g., dancing), audio 114, and/or an identity of device 116 providing audio 114. User activity 118 may be detected, for example, using one or more modeling and/or tracking mechanism(s) (e.g., skeletal tracking pipeline(s)), inertial devices coupled to the user (e.g., via mobile devices, inertial sensors, etc.), etc. Detection of audio 114 may be provided, for example, via audio sensors 106 (e.g., via audio fingerprint identification), whereas device 116 may be detected via image sensors 104 (e.g., via shape recognition) and/or via audio sensors 106 (e.g., via beam forming mechanism(s)). As mentioned above, state features may include any features of environment 100 detectable via sensor system 102, and it will therefore be appreciated that such features are presented for the purpose of example, and are not intended to be limiting in any manner.

In some situations, continual identification of any one or more state features via sensor system 102 may utilize significant resources (e.g., power, processor bandwidth, network bandwidth, etc.) even when a user that has selected to be passively sensed is not in the use environment. Accordingly, sensor system 102 may be configured to passively monitor environment 100 until detecting activity, at which time the sensor system may begin actively monitoring the environment. Thus, when no activity (e.g., user presence, content item playback, etc.) is detected, sensor system 102 and/or computing device 108 may be configured to acquire sensor data at a lower "quality" (e.g., a lower bitrate), and to acquire sensor data at a higher "quality" once activity is detected. By acquiring sensor data at a lower bit rate in order to detect activity while utilizing sensor data of a higher bitrate for state feature identification, such a configuration may leverage the richer data set provided by sensor system 102 while potentially utilizing a decreased amount of resources, among other potential benefits. It will be understood that data acquisition at the higher bitrate may continue even after the triggering activity has ceased. For example, if a user walks into a room and then lies down, higher bitrate data acquisition may continue while the user is present in the environment even if the original triggering activity (e.g. user movement) has ceased.

Activity sufficient to trigger data acquisition and analysis at the higher "quality" level may be detected in any suitable manner. For example, in some embodiments, such activity may correspond to motion meeting a motion threshold (e.g., movement beyond a threshold velocity and/or displacement), sound meeting a sound threshold (e.g., sound exceeding a particular decibel level), a presence of one or more users in the use environment (e.g., via skeletal tracking, humanoid shape detection, etc.).

Upon detection of activity, computing device 108 may be configured to identify any one or more state features of environment 100. For example, audio 114 state features may be identified by acquiring an audio sample and comparing the audio sample to known audio information. In some embodiments, computing device 108 may be communicatively coupled to one or more remote services, and may be configured to provide at least some of the acquired audio sample to the remote service for identification. In other embodiments, computing device 108 may be configured to provide such identification instead of, or in addition to, the remote service(s). Similarly, other state features (e.g., user activity 118, audio device 116) may be identified by capturing one or more image samples and comparing the image sample(s) to known image information.

In some embodiments, sensor data and/or samples thereof representing any one or more state features (e.g., user body size and/or shape) may be compared to information regarding one or more previous states of the particular state feature(s). In this way, one or more state features may be tracked over time, thereby potentially providing improved recommendation performance by providing an understanding of state progression, as opposed to merely an understanding of individual state(s). It will be appreciated that, in order to provide such progression monitoring, computing device 108 may be configured to store state(s) (e.g., via device 108 and/or remote computing devices, services, etc.) of any one or more state features. Such storage may be provided, for example, only if the user has provided authorization to be monitored by the sensor system. Determination of such authorization may include, but is not limited to, recognizing previously-defined authorization information (e.g., user profile(s)) and/or recognizing authorization gesture(s) (e.g., verbal, physical, etc.) performed by the user. Authorization may be controlled, for example, via one or more opt-in and/or opt-out mechanisms, though other configurations are possible without departing from the scope of the present disclosure. In some embodiments, computing device 108 may provide substantially anonymous monitoring where previous state information is not stored or otherwise utilized, though it will be appreciated that such anonymous monitoring may not provide a suitably rich data set, as compared to other approaches.

Upon recognizing any one or more state features of environment 100, computing device 108 may be configured to determine whether or not of any of said state features meet or exceed a corresponding triggering condition. In other words, such triggering condition(s) determine whether or not information (e.g., recommendations) related to the triggering state feature(s) is to be provided.

As one non-limiting example of such triggering threshold detection, change(s) in any one or more physical feature(s) of user 112 meeting a triggering threshold (e.g., change in body size beyond a threshold level) may be identified via analysis of (e.g., comparison with) stored state information. As another example of a triggering threshold, audio 114 from audio device 116 may be identified after a temporal threshold (e.g., 30 seconds of audio) has been met, so as to ensure that audio 114 is actively being listened to, and is not merely being "scanned" or "sampled." In some embodiments, one or more triggering conditions may include an explicit user input (e.g., via gesture, via input device, etc.) requesting recommendation(s). Though each state feature has been described as having a single corresponding triggering threshold, it will be appreciated that any one or more state features may correspond to any one or more triggering conditions having any one or more triggering thresholds without departing from the scope of the present disclosure.

As mentioned above, upon recognizing satisfaction of any one more triggering conditions, computing device 108 may be configured to provide information 119 (e.g., recommendation(s)) related to the corresponding state feature(s). Where the state feature(s) include one or more media content items (e.g., audio 114), information 119 related to the state features(s) may include, but is not limited to, information 120 regarding a related content item, auxiliary information 122 for the content item, and a link 125 to acquire (e.g., download and/or purchase) an instance of the content item. In some embodiments, information 119 may include one or more mechanism(s) 124 to add the detected content item to a content playlist (e.g., online music service playlist, playlist of content items recently detected via the sensor system, etc.).

Information 120 regarding a related content item may include, for example, recommendations for related content item(s), mechanism(s) to acquire such related content items, mechanism(s) to add the related content items to a playlist, and/or other suitable information. Although illustrated as text-based information presented via a "stand-alone" recommendation user interface via display device 110, it will be appreciated that information 120 may include any information regarding related item(s), and may be provided via any suitable mechanism(s), without departing from the scope of the present disclosure.

Where the state feature(s) include a user activity (e.g., activity 118), computing device 108 may be configured to provide recommendations (e.g., advertisements, promotional offers, etc.) for goods and/or services related to the user activity. Furthermore, in some embodiments, related content items may be determined based at least on detected user activity 118. For example, computing device 108 may be configured to detect that user 112 is dancing, and may recommend dance music in response. Continuing with the dancing example, computing device 108 may be configured to determine the "style" of dance, and may provide recommendations based on the determined style. For example, recognizing user activity 118 as approximating a "disco" dance style may effect recommendations of disco-type music.

Where the state feature(s) include one or more physical features of user 112, such information may include, for example, information describing a change in the physical feature (e.g., notification of weight gain), a recommendation of goods or services related to the physical feature (e.g., advertisement for wellness goods or services), and a recommendation of one or more changes to user behavior (e.g., instructions for more exercise).

In some embodiments, information 119 may include auxiliary information 122 corresponding to the detected state feature(s). As illustrated, information 122 may include content identification (e.g., artist, album, etc.), related visual information (e.g., cover art, music visualization(s), etc.), and other auxiliary information (e.g., lyrics, etc.) related to the detected state feature(s). Presentation of information 122 may be desirable, for example, for identifying and/or learning about the detected state feature(s).

In some scenarios, the detection and understanding of multiple state features may enable computing device 108 to potentially locate more relevant recommendations. For example, by understanding multiple, related state features (e.g., audio 114 being consumed while user 112 dances), context may be provided for such state features, which may be used in determining recommendations. For example, detection of both audio 114 and user activity 118 may trigger the provision of information 119 (e.g., dance lessons advertisement 126) related to both audio 114 and activity 118 (e.g., dance music), whereas information 119 related to audio 114 (e.g., information 122 and/or information 120) may be triggered if user activity 118 is not detected along with audio 114. Such scenarios are presented for the purpose of example, and are not intended to be limiting in any manner.

Figure 1B:
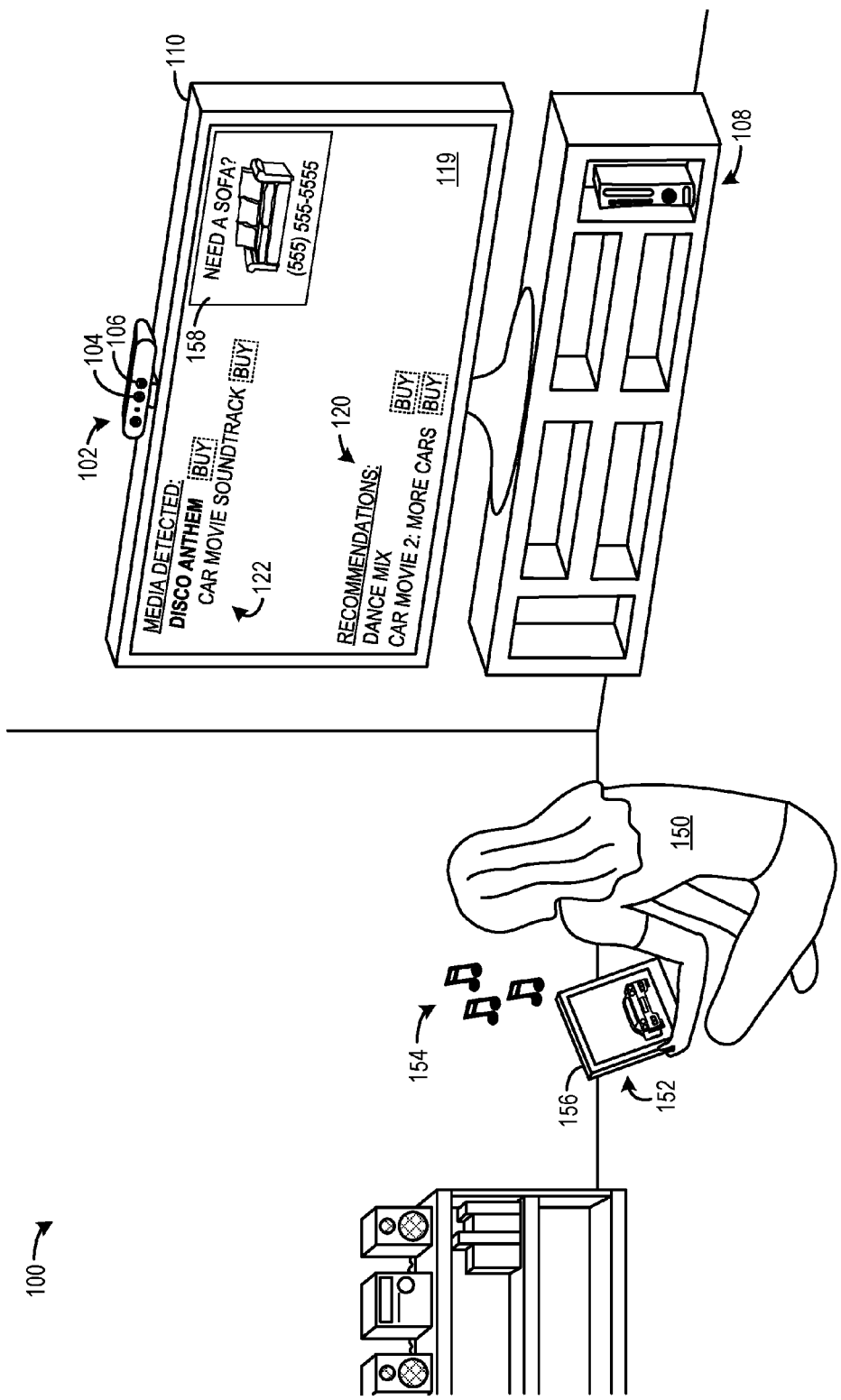

Turning now to FIG. 1B, environment 100 of FIG. 1A is illustrated in another use case scenario involving a user 150 viewing media content 152 (e.g., a movie) including audio 154 (e.g., soundtrack song(s)) via computing device 156, shown as a tablet computing device. In this scenario, media content 152, constituent audio 154 of media content 152, and operating computing device 156 are each examples of state features detectable via sensor system 102. Audio 154 may be detected, for example, via audio sensors 106, and media content 152 and computing device 156 may be detected by image sensors 104 and/or audio sensors 106, for example, by acquiring image sample(s) of computing device 156 and comparing the sample(s) to known image information. Additionally, computing device 156 may comprise sensors located thereon that may provide sensor data to computing device 108. Sensor information from computing device 156, and/or from other suitable mobile devices (e.g. a smart phone), may be acquired and analyzed by computing device 156 even when the user is not within the environment monitored by sensor system 102.

In the illustrated example, computing device 108 identifies both media content 152 (e.g., "Car Movie") and constituent audio 154 (e.g., "Disco Anthem" from Car Movie Soundtrack), as illustrated by auxiliary information 122. Information 120 regarding related media content item(s) includes recommendations based on either media content 152 (e.g., "Car Movie 2: More Cars") or audio 154 (e.g., "Dance Mix"). In other embodiments, at least some of information 120 may be based on both media content 152 and constituent audio 154.

As mentioned above, state feature(s) may include physical feature(s) of any one or more users and/or any activities performed by the users. As illustrated in the example scenario of FIG. 1B, user 150 is presently seated on the floor while operating computing device 156. In such scenarios, information 119 provided by computing device 108 may include information 158 (e.g., sofa advertisement) based on these state features. In other words, as illustrated by information 158, computing device 108 may be configured to provide recommendations (e.g., advertisements, instructions, etc.) based on observed user behavior (e.g., sitting on the floor), based on environment feature(s) (e.g., lack of sofa), and/or a combination thereof.

As another non-limiting example, computing device 108 may be configured to provide information 119 including recommendation(s) for computing device(s) related to computing device 156. Such recommendations may include, for example, an advertisement for a competing product or an advertisement for an upgraded version of computing device 156. It will once again be appreciated that, even though an activity (e.g., consumption of media content 152) utilizes computing device(s) other than computing device 108, such activity may be leveraged in order to provide related information that is potentially more useful (e.g., specific) than typical approaches.

Although information 119 is illustrated as including text and/or other visual information provided via display device 110, it will be appreciated that such information may be presented in any other suitable manner. For example, in some embodiments, information 119 related to one or more state features may be provided via computing device(s) other than computing device 108. As more specific examples, information 119 may be displayed via another computing device, such as a tablet computing device, communicatively coupled to computing device 108 via a wireless or wired connection. This may enable, for example, a "two-screen experience," with supplemental information (e.g., character backgrounds, content previews, reviews, etc.) being provided via the other computing device(s).

In some embodiments, information 119 may not be displayed until suitable recommendation(s) have been determined and/or are requested. That is, computing device 108 may be configured to passively monitor environment 100, detect activity in the environment, and recognize state features, all with user 150 being substantially unaware of such operations. Thus, upon determination of one or more recommendations, computing device 108 may be configured to provide information 119 by, for example, enabling (e.g., powering on, waking from sleep mode, etc.) display device 110.

Figure 2:
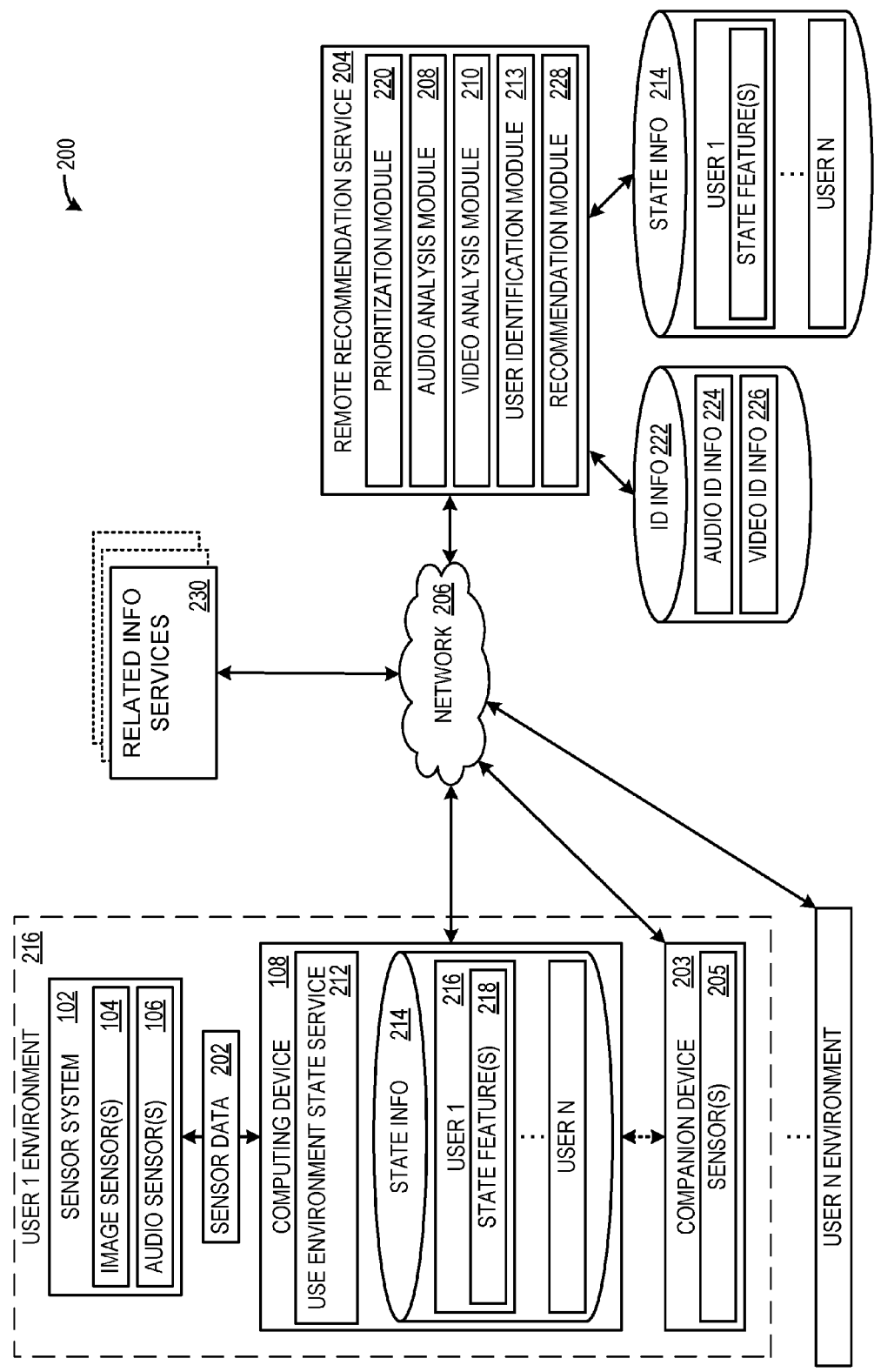
FIG. 2 schematically shows a use system for providing recommendations according to an embodiment of the present disclosure.

FIG. 2 illustrates a block diagram of an embodiment of a system 200 for providing recommendations based upon environmental sensor data. System 200 includes computing device 108 communicatively coupled to sensor system 102, which comprises one or more two-dimensional and/or three-dimensional image sensors 104 and/or one or more audio sensors 106 (e.g., microphone array). Image sensors 104 may include, for example, one or more depth cameras configure to determine a three-dimensional representation (i.e., depth map) of the environment monitored via sensor system 102. Such a configuration may desirable, for example, in order to track user pose and movement (e.g., via one or more skeletal tracking pipelines). Image sensors 104 also may include one or more two-dimensional image sensors, such as a color image sensor. Similarly, audio sensors 106 may include a microphone array, for example, in order to determine the location of any one or more audio sources (e.g., audio device 116, computing device 156 of FIGS. 1A-1B, etc.) using beam forming and/or other mechanisms. As mentioned above, one or more components of computing device 108 and sensor system 102 may be incorporated into any one or more discrete device(s) (e.g., mobile computing device) in various embodiments without departing from the scope of the present disclosure.

During passive monitoring (i.e., prior to detecting activity and/or user presence), computing device 108 may be configured to acquire sensor data 202 via sensor system 102 at a first, lower bit rate. As sensor data 202 may utilize a non-trivial amount of storage space and/or other computing resources, acquisition of the sensor data at a lower bit rate may enable computing device 108 to continually monitor the environment without imparting undue burden on computing device 108 and/or other computing devices, services, etc. Furthermore, in some embodiments, computing device 108 may be configured to provide at least some of sensor data 202 to remote recommendation service 204 via network 206 for analysis (e.g., via audio analysis module 208 and/or video analysis module 210). Utilizing a remote service, such as remote recommendation service 204, may be desirable in some circumstances, as analysis of sensor data 202 may rely upon resources (e.g., databases, memory, etc.) not available to, or not readily implemented via, computing device 108.

Upon detecting activity either locally or via remote recommendation service 204, computing device 108 may be configured to identify one or more users present in the environment monitored by the sensor system. Identification of the user(s) may be performed via any suitable mechanism or mechanisms (e.g., gestures, roaming profile, visual and/or audio information, etc.) without departing from the scope of the present disclosure. As with detection of activity, such identification may be provided, in whole in part, locally by computing device 108 and/or via a remote recommendation service 204 operating a user identification module 213. The identification of users may enable computing device 108 to analyze and/or store state information 214 for detected users that have authorized such analysis and/or storage. It will be understood that monitoring may be provided for an arbitrary number N of users utilizing any one or more device(s), represented as user 1 environment 216 and user N environment, without departing from the scope of the present disclosure. In some embodiments, recognition of the user(s) may not be performed.

As mentioned above, in some embodiments once activity has been detected, sensor data 202 may be acquired and/or analyzed at a second, higher bitrate corresponding to an "active" monitoring mode. At least some of the sensor data may be acquired from one or more companion devices 203 (e.g., mobile computing devices) including any one or more sensors 205 (e.g., inertial sensors, microphones, image sensors, etc.) in some embodiments. For example, computing device 108 may be configured to utilize sensor data 202 from sensor system 102 during passive monitoring, and may be configured to utilize both sensor system 102 and sensors 205 of companion device(s) 203 during active monitoring. This may help to preserve battery life on the companion devices. Likewise, sensors on companion device(s) 203 also may be utilized when a user is outside of an environment monitored by sensor system 102. It will be appreciated that these configurations are presented for the purpose of example, and sensor data 202 may be acquired from any one or more sensors during any one or more operating modes without departing from the scope of the present disclosure.

Similar to the lower bitrate data, the higher bitrate data may be analyzed by computing device 108 and/or may be provided to remote recommendation service 204. As the remote recommendation service may be configured to analyze both low bitrate streams and high bitrate streams, remote recommendation service 204 may include prioritization module 220 configured to prioritize incoming requests. In other words, as higher bitrate request may signify that a user is in a corresponding environment, it may be desirable to preferentially field such active requests so that recommendations may be provided promptly to the user.

For example, as illustrated, system 200 may include a plurality of computing devices 108 and/or sensor systems 102 for a plurality of users 216, each of which may interface with one or more shared remote recommendation services 204. Thus, in order to provide a suitable user experience, prioritization module 220 may be utilized in order to provide preferential analysis of higher bitrate (active) requests. In some embodiments, the higher-priority requests may be identified (e.g., via "flags" or other metadata) by the sending computing device 108. In other embodiments, the prioritization module may be configured to analyze the received sensor data 202, and may provide prioritization based on the analysis of the received data.

Upon entering an active monitoring mode, use environment state service 212 of computing device 108 may be configured to recognize state information 214 (e.g., current state) of any one or more state features 218. As illustrated, state information 214 may be stored via computing device 108 and/or via one or more locations accessible to remote recommendation service 204, though other configurations are possible without departing from the scope of the present disclosure.

Once state information 214 has been determined, identification of various state feature(s) 218 may be provided. For example, sensor data 202 provided to remote recommendation service 204 may include one or more sensor "samples" (e.g., audio and/or video samples) representing the monitored environment. This information may be compared to, for example, known identification information 222, including, but not limited to, known audio information 224 and known video (image) information 226. In other words, an audio and/or video "fingerprint" may be determined and compared (e.g., via audio analysis module 208 and/or video analysis module 210) to known fingerprints in order to identify at least some of the state features monitored by sensor system 102. In other embodiments, any other suitable analysis mechanism or mechanisms may be utilized.

Once the one or more state features have been recognized, based on a current state of the state feature(s) 218 and/or on a state progression (e.g., change in body size or shape) captured via state information 214, recommendation(s) may be determined. For example, as illustrated, remote recommendation service 204 may further include recommendation module 228 configured to provide such recommendation(s).

Further, in some embodiments, recommendations may be at least partially provided by one or more related information services 230 accessible via network 206. For example, upon identifying the one or more state feature(s), representative information (e.g., metadata describing the state features) may be provided to services 230, and services 230 may utilize the representative information and/or additional information (e.g., service-specific user interaction history) in order to provide recommendations. As mentioned above with reference to FIGS. 1A and 1B, it will be appreciated that recommendation(s) may include any suitable information presentable via any suitable mechanism(s) without departing from the scope of the present disclosure.

Figure 3:
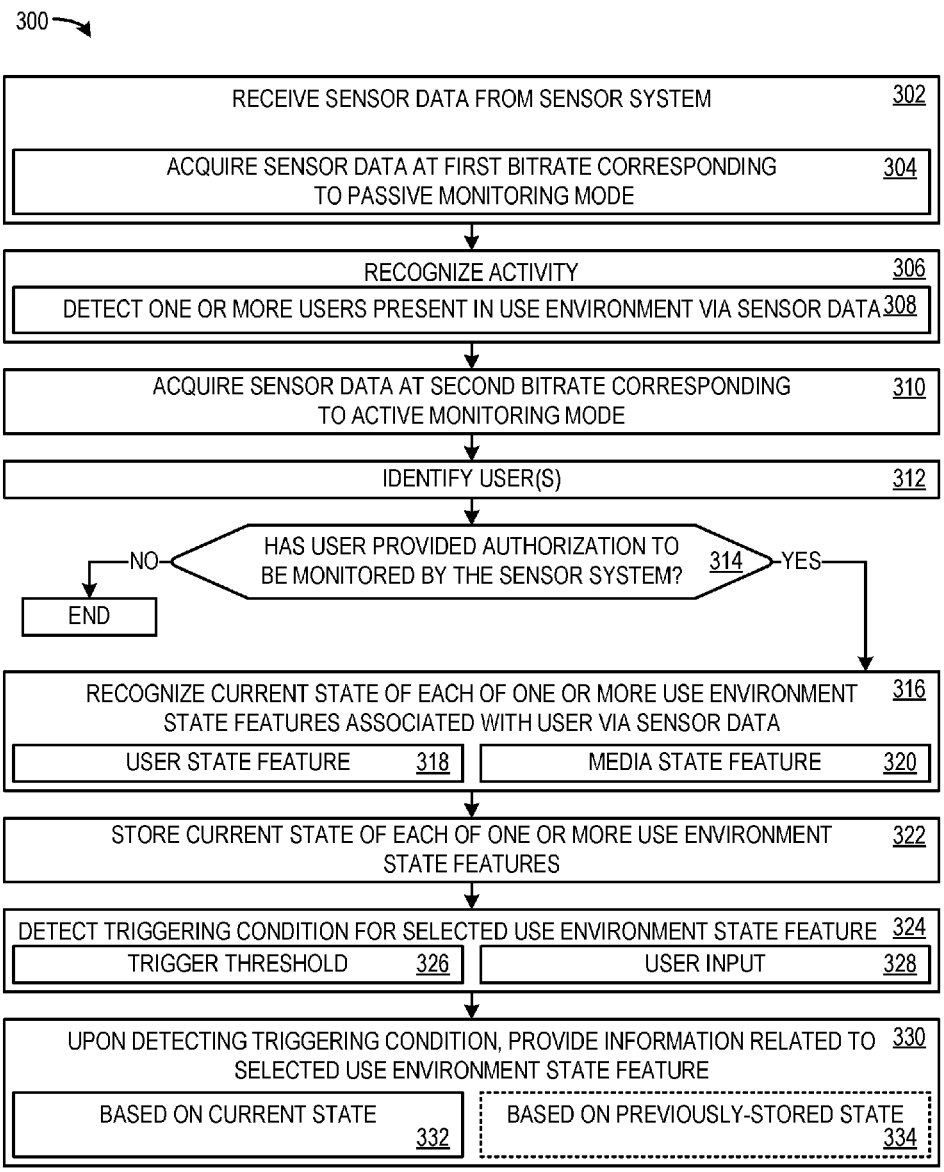
FIG. 3 shows a process flow depicting an embodiment of a method for monitoring one or more state features of a use environment according to an embodiment of the present disclosure.

FIG. 3 shows a flow diagram depicting an embodiment of a method 300 for providing recommendations based upon passively sensing a use environment. At 302, method 300 comprises receiving sensor data from a sensor system including one or more sensors. In some instances the sensor system may be configured to monitor a use environment via image and/or audio sensors. In other instances, the sensor system may be incorporated into a mobile device that a user carries in multiple environments. In yet other instances, data may be received from sensors on a plurality of different devices, including, but not limited to, stationary and mobile sensing devices. It will be understood that the sensor system may take any suitable form without departing from the scope of the present disclosure.

Receiving the sensor data may include, for example, acquiring 304 the sensor data at a first bitrate corresponding to a passive monitoring mode. The first bitrate may be lower than, for example, a second bitrate corresponding to an active monitoring mode. In some embodiments, the sensor data may be acquired at a variable bitrate that may fluctuate according to various considerations (e.g., availability of computing resources, network bandwidth, etc.).

At 306, method 300 further comprises recognizing activity in the use environment based on the sensor data. As mentioned above, recognizing activity may include, but is not limited to, detecting motion meeting a motion threshold (e.g. where a person enters a room monitored by a sensor system in the room, where a person picks up a mobile device having a sensor system, etc.) and/or detecting sound meeting a sound threshold.

Further, in some embodiments, recognizing activity may include detecting, though not necessarily identifying, one or more users present in the scene (e.g., humanoid shape detection). Although the sensor data acquired at the lower bitrate may or may not provide suitable information to identify the user(s), such information may be usable to identify the presence and/or number of user(s) within the environment.

In some embodiments, information related to any one or more environment state features may be selected based upon the number of detected users. As one non-limiting example, detection of a plurality of users may indicate that a party is occurring, and such insight may be usable to provide recommendations that are more likely to be relevant to a party scenario. In such scenarios, detection of multiple users may effect recommendation(s) for dance music, whereas detection of a single user may effect recommendation(s) for other music selected based upon other user information and/or contextual information.

Recognizing the number of users present in a scene further may facilitate enforcement of licensing agreements for various content items. For example, typical end-user licenses may define a maximum number of simultaneous users that constitute an allowed performance of a particular content item. Accordingly, by detecting the number of users present in a scene, and thus the number of simultaneous users potentially experiencing the content item, playback of the media content item (e.g., via computing device 108) may only be allowed if the maximum number of simultaneous users has not been exceed. If the number of simultaneous users has been exceeded, presentation of the media content item may be prevented until additional license(s) are acquired and/or a suitable number of users leave the environment.

Regardless of the mechanism(s) by which activity is detected, detection of such activity may trigger active monitoring of the use environment, as described above. Accordingly, method 300 further comprises acquiring 310 sensor data at a second (e.g., higher) bitrate corresponding to an active monitoring mode. Although described in terms of varying bitrates, the sensor data, generally speaking, may be acquired at increased "quality" upon detecting activity and/or user presence. Such an approach may enable substantially continual monitoring of the use environment without unduly burdening any one or more devices and/or services.

It will be understood that the activity that triggers the higher quality monitoring mode may be temporary, yet the cessation of the activity may not trigger a return to a lower quality monitoring mode in some circumstances. For example, where a user enters a room (thereby triggering higher quality monitoring) and then takes a nap (thereby failing a motion or other activity threshold), the presence of the user represented by the sensor data may result in maintenance of a the higher quality mode, even where the user does not make any significant motions during the nap.

Continuing, at 312, method 300 may include identifying one or more users present in the scene and associating the sensor data with the user(s). In some embodiments, each user may be identified based on the sensor data (e.g., via user-specific gestures, facial recognition, voice pattern recognition, etc.) and/or via other mechanisms (e.g., Near Field Communication "NFC" mechanisms, user input devices, etc.). Identification of the user(s) present in the scene may enable storage, and thus tracking, of any one or more state features over a period of time, among other potential benefits. Additionally, a user may be identified for sensing via a mobile device by such acts as logging into the device, logging into an application running on the device, based upon motion patterns/voice patterns/other personal biometric information detected via sensors on the mobile device, or in any other suitable manner.

At 314, method 300 may further comprise determining whether the user(s) have been provided authorization to be monitored by the system. Such a determination may be provided, for example, by recognizing previously-provided authorization information (e.g., via one or more user profiles), recognizing an authorization gesture performed by the user (e.g., verbal command, user pose and/or movement, etc.), and/or in any other suitable manner. In some embodiments, such authorization may include authorization to be monitored by the system, but may not include authorization to store corresponding state information.

If the user has not provided authorization to be monitored by the system, method 300 may end. However, if the user has provided authorization, method 300 continues to 316, where the method further comprises recognizing a current state of each of one or more use environment state features associated with the user. The one or more state features may include, for example, user state feature(s) 318 (e.g., user body size or shape, user activity, etc.) and/or media state feature(s) 320 (e.g., presented media content item, constituent content item, present device, etc.), among others. Subsequently, at 322, method 300 may further comprise storing the current state of each of the one or more use environment state features. The current state may be stored, for example, via one or more local storage machines and/or via one or more remote storage machines (e.g., via remote recommendation service 204). The stored state information may include, for example, "raw" sensor data 202 and/or one or more metrics, or other representative information, computed therefrom. Storage of representative information may utilize decreased storage space, enable faster retrieval and comparison, and/or may otherwise provide a more desirable user experience.

At 324, method 300 may further comprise detecting a triggering condition for any one or more environment state features. In some embodiments, such a triggering condition may be detected for a single, user-designated state feature, whereas triggering condition(s) for each monitored state feature may be detected in other embodiments. In some embodiments, triggering conditions may include meeting of a trigger threshold 326, such as, for example, length of sensor data acquisition, change in state feature (e.g., increase in body weight beyond a set threshold), detection of one or more predefined state features (e.g., audio 114 and user activity 118), and/or a combination thereof. In other embodiments, a triggering condition may include receiving a user input 328 (e.g., via one or more input devices) requesting provision of the information related to the selected use environment state feature.

Upon detecting the triggering condition(s), method 300 further comprises providing, at 330, information related to the selected use environment state feature based upon the current state 332 of the use selected use environment state feature and/or one or more previously-stored states 334 of the selected use environment state feature. In other words, information may be provided based on a state progression (e.g., comparison between current state 332 and one or more previous states 334), based on a current state 332 (e.g., comparison between current state 332 and one or more trigger thresholds), and/or based on other suitable information.

It will be understood that the embodiments described above are presented for the purpose of example, and that the concepts illustrated may be applied to any suitable scenario. For example, a triggering condition for an environmental state feature may correspond to a lack of activity, such that a recommendation or other response may be triggered by a detected lack of motion of a user. As a more specific example, an alert sent to medical personnel (e.g. by calling 911), family members (e.g. by text message or other mechanism), or other persons or institutions may be triggered by a lack of motion of a person, as detected via sensor data, for a predetermined period of time sufficient to indicate a possible medical problem. In this example, user consent for triggering such a response may be provided by the person ahead of time. Likewise, a recommendation of an activity may be provided upon detecting someone spending a large amount of time lying on a sofa watching television. Additionally, recommendations may be made based upon sensing multiple people in different environments. As a more specific example, if two users who are friends are sitting passively in different environments, information regarding these states of the users may be used to generate a recommendation of an activity to be enjoyed together (e.g. a suggestion to go bowling).

In some embodiments, the methods and processes described above may be tied to a computing system of one or more computing devices. In particular, such methods and processes may be implemented as a computer-application program or service, an application-programming interface (API), a library, and/or other computer-program product.

Figure 4:
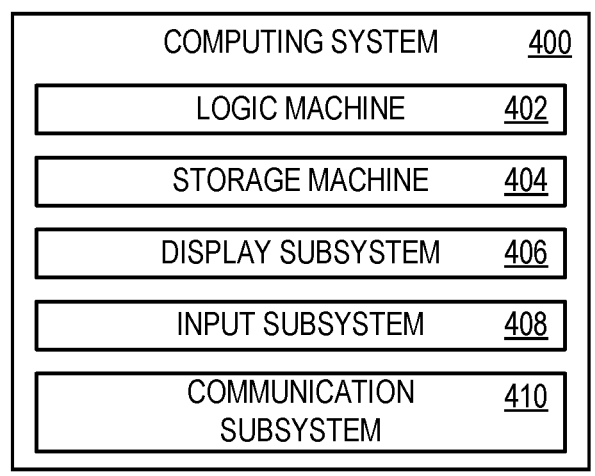
FIG. 4 schematically shows a computing device according to an embodiment of the present disclosure.

FIG. 4 schematically shows a non-limiting embodiment of a computing system 400 that can enact one or more of the methods and processes described above. Computing system 400 is shown in simplified form. Sensor system 102, computing device 108, computing device 156, and remote recommendation service 204 are non-limiting examples of computing system 400. It will be understood that virtually any computer architecture may be used without departing from the scope of this disclosure. In different embodiments, computing system 400 may take the form of a mainframe computer, server computer, desktop computer, laptop computer, tablet computer, home-entertainment computer, network computing device, gaming device, mobile computing device, mobile communication device (e.g., smart phone), etc.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold and/or store machine-readable instructions executable by the logic machine to implement the methods and processes described herein. For example, logic machine 402 may be in operative communication with storage machine 404. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include machine-readable volatile, non-volatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, microphone, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic subsystem; and
a data storage subsystem comprising instructions stored thereon that are executable by the logic subsystem to:
receive sensor data from a sensor system including one or more sensors configured to acquire the sensor data by monitoring a use environment;
associate the sensor data with a user;
detect via the sensor data a plurality of users present in the use environment;
receive a request to present a media content item;
prevent presentation of the media content item if the plurality of users in the use environment exceeds a number allowed by an end-user license for the media content item; and
allow presentation of the media content item if the plurality of users does not exceed the number allowed by the end-user license for the media content item.

2. The computing device of claim 1, further comprising capturing the sensor data at a first, lower bitrate corresponding to a passive monitoring mode when no activity is detected, and at a second, higher bitrate corresponding to an active monitoring mode when activity is detected.

3. The computing device of claim 1, further comprising recognizing a current state of each of one or more use environment state features associated with each user via the sensor data;
storing the current state of each of the one or more use environment state features;
detecting a triggering condition for a selected use environment state feature; and
upon detecting the triggering condition, provide a recommendation of media content for consumption.

4. The computing device of claim 3, where the instructions are further executable to determine whether the user has provided authorization to be monitored by the sensor system, where the current state of each of the one or more use environment state features associated with the user are stored only if the user has provided authorization.

5. The computing device of claim 3, where the selected use environment state feature includes one of a physical feature of the user, an activity performed by the user, and a device being operated by the user.

6. The computing device of claim 5, where the triggering condition includes a change in the physical feature of the user meeting a triggering threshold.

7. The computing device of claim 6, where the information related to the selected use environment feature includes one or more of information describing the change in the physical feature, a recommendation of goods or services related to the physical feature, and a recommendation of one or more changes to user behavior.

8. The computing device of claim 3, where the selected use environment state feature includes one of an identity of a content item being consumed in the use environment, an identity of a constituent component of the content item being consumed in the use environment, a device accessing the content item, and a current access position of the content item.

9. The computing device of claim 8, where the triggering condition includes a user input requesting provision of the information related to the selected use environment state feature.

10. The computing device of claim 8, where the information related to the selected use environment state feature includes one or more of information regarding a related content item, auxiliary information for the content item, and a link to acquire an instance of the content item.

11. The computing device of claim 1, where the one or more sensors include one or more of an audio sensor and an image sensor.

12. A method for monitoring a use environment, the method comprising:
acquiring sensor data via one or more sensors monitoring the use environment;
detecting via the sensor data a plurality of users present in the use environment;
receiving a request to present a media content item;
allowing presentation of the media content item if the plurality of users does not exceed a number allowed by an end-user license for the media content item; and
preventing presentation of the media content item if the plurality of users in the use environment exceeds the number allowed by the end-user license for the media content item.

13. The method of claim 12, further comprising:
acquiring first sensor data at a first bitrate via the one or more sensors, the first bitrate corresponding to a passive monitoring mode;
recognizing activity in the use environment based on the first sensor data; and
in response, acquiring second sensor data at a second bitrate via the one or more sensors, the second bitrate being higher than the first bitrate and corresponding to an active monitoring mode.

14. The method of claim 12, further comprising providing a recommendation of a media content item based upon the sensor data.

15. The method of claim 13, where recognizing activity in the use environment comprises detecting one or more of motion meeting a motion threshold, sound meeting a sound threshold, and a user present in the use environment.

16. The method of claim 12, where detecting via the sensor data the plurality of users comprises detecting the plurality of users via depth image data.

17. The method of claim 12, further comprising detecting one or more of the plurality of users performing a different activity than another of the plurality of users, and recommending an activity that can be performed by the plurality of users together.

18. The method of claim 12, further comprising:
prior to detecting the plurality of users, acquiring first sensor data at a first bitrate via the one or more sensors monitoring the use environment, the first bitrate corresponding to a passive monitoring mode, where detecting activity in the use environment is based on the first sensor data; and
in response to detecting one or more of the plurality of users in the use environment, acquiring second sensor data at a second bitrate via the one or more sensors, the second bitrate being higher than the first bitrate and corresponding to an active monitoring mode.

19. A computing device, comprising:
a logic subsystem; and
a data storage subsystem comprising instructions stored thereon that are executable by the logic subsystem to:
acquire sensor data from a sensor system including one or more sensors monitoring a use environment, the sensor data comprising depth image data;
detect a plurality of users present in the use environment via the sensor data;
allow presentation of the media content item if the plurality of users does not exceed the number allowed by an end-user license for the media content item; and
prevent presentation of a media content item if the plurality of users in the use environment exceeds a number allowed by the end-user license for the media content item.

20. The computing device of claim 19, the instructions being further executable to determine an activity performed by one or more of the plurality of users in the use environment, and provide a recommendation based on the activity.

* * * * *